(12) United States Patent
Abulafia et al.

(10) Patent No.: US 9,305,230 B2
(45) Date of Patent: Apr. 5, 2016

(54) INTERNET PAYMENT SYSTEM USING CREDIT CARD IMAGING

(75) Inventors: David Abulafia, Raanana (IL); Eyal Cohen, Raanana (IL)

(73) Assignee: JUMIO INC., Singapore (SG)

( * ) Notice: Subject to any disclaimer, the term of this patent is extended or adjusted under 35 U.S.C. 154(b) by 0 days.

(21) Appl. No.: 13/275,203

(22) Filed: Oct. 17, 2011

(65) Prior Publication Data

US 2012/0143760 A1 Jun. 7, 2012

Related U.S. Application Data

(63) Continuation-in-part of application No. 12/502,269, filed on Jul. 14, 2009.

(60) Provisional application No. 61/134,665, filed on Jul. 14, 2008.

(51) Int. Cl.
*G06Q 40/00* (2012.01)
*G06K 9/20* (2006.01)
*G06K 9/22* (2006.01)
(Continued)

(52) U.S. Cl.
CPC .............. *G06K 9/2054* (2013.01); *G06K 9/228* (2013.01); *G06Q 20/10* (2013.01); *G06Q 20/40* (2013.01); *H04M 1/72522* (2013.01);
(Continued)

(58) Field of Classification Search
CPC .................................................. G06Q 20/3274
USPC .......................................................... 705/64
See application file for complete search history.

(56) References Cited

U.S. PATENT DOCUMENTS 6,128,398 A 10/2000 Kuperstein et al.
6,201,548 B1 3/2001 Cariffe et al.
(Continued)

FOREIGN PATENT DOCUMENTS

CN 101022489 8/2007
KR 2002/0011052 A 2/2002
(Continued)

OTHER PUBLICATIONS

Abulafia, Final Rejection, U.S. Appl. No. 12/502,269, Jun. 22, 2012, 22 pgs.
(Continued)

*Primary Examiner* — Charles C Agwumezie
(74) *Attorney, Agent, or Firm* — Morgan, Lewis & Bockius LLP

(57) ABSTRACT

A system and a method for conducting credit card transactions through a mobile device of a user. The mobile device comprises an image acquisition unit and a mobile application operated by the mobile device. The system enables acquiring an image of a client's credit card, using the image acquisition unit; analyzing data of the image; outputting details of the credit card from the analysis; verifying the output details, wherein the verification is further carried out through the mobile application; verifying authorization of inputted monetary transaction, wherein the mobile application enables verifying the authorization by communicating with the billing center, associated with at least one credit company associated with the credit card over at least one communication network, wherein the communication is carried out by the mobile application using the mobile device; and conducting monetary transactions using the verified credit card details.

20 Claims, 9 Drawing Sheets

(51) Int. Cl.
*G06Q 20/10* (2012.01)
*G06Q 20/40* (2012.01)
*H04M 1/725* (2006.01)
H04M 17/00 (2006.01)

(52) U.S. Cl.
CPC .. *G06K 2209/01* (2013.01); *H04M 2017/2525* (2013.01); *H04M 2250/14* (2013.01); *H04M 2250/52* (2013.01)

(56) References Cited

U.S. PATENT DOCUMENTS

| | | | |
|---|---|---|---|
| 6,873,715 | B2 | 3/2005 | Kuo et al. |
| 7,118,032 | B2 | 10/2006 | Elliot et al. |
| 7,143,942 | B2 | 12/2006 | Yamanaka et al. |
| 7,653,183 | B2 | 1/2010 | Patel et al. |
| 8,577,810 | B1 | 11/2013 | Dalit et al. |
| 2002/0065728 | A1 | 5/2002 | Ogasawara |
| 2003/0173401 | A1 | 9/2003 | Yamagami |
| 2004/0107170 | A1 | 6/2004 | Labrou et al. |
| 2005/0009564 | A1 | 1/2005 | Hayaashi et al. |
| 2005/0093999 | A1 | 5/2005 | Yamaya |
| 2005/0247797 | A1* | 11/2005 | Ramachandran ............ 235/492 |
| 2006/0129485 | A1* | 6/2006 | Hamzy et al. .................. 705/40 |
| 2006/0144925 | A1* | 7/2006 | Jones ............................. 235/380 |
| 2006/0237530 | A1* | 10/2006 | Elliot et al. .................. 235/380 |
| 2007/0156592 | A1 | 7/2007 | Henderson |
| 2008/0298588 | A1 | 12/2008 | Shakkarwar |
| 2009/0110279 | A1* | 4/2009 | Jain et al. ..................... 382/176 |
| 2009/0173784 | A1 | 7/2009 | Yang |
| 2009/0234773 | A1 | 9/2009 | Hasson |
| 2009/0328166 | A1* | 12/2009 | Burch et al. .................... 726/6 |
| 2010/0008535 | A1 | 1/2010 | Abulafia et al. |
| 2010/0078472 | A1 | 4/2010 | Lin et al. |
| 2010/0171826 | A1* | 7/2010 | Hamilton et al. ............. 348/135 |
| 2011/0276484 | A1 | 11/2011 | Pearson et al. |

FOREIGN PATENT DOCUMENTS

| | | |
|---|---|---|
| KR | 2004-0046555 | 6/2004 |
| KR | 10-0724432 | 5/2007 |
| WO | WO 03/047208 A1 | 6/2003 |
| WO | WO 2005/066907 A1 | 7/2005 |

OTHER PUBLICATIONS

Abulafia, Office Action, U.S. Appl. No. 12/502,269, Dec. 15, 2011, 16 pgs.
Simon, Know the latest credit card fraud techniques, Nov. 2, 2006, 2 pgs.
Abulafia, Office Action, U.S. Appl. No. 12/502,269, Apr. 20, 2015, 23 pgs.
Abulafia, Notice of Allowance, U.S. Appl. No. 12/502,269, Oct. 9, 2015, 8 pgs.
Mattes, Final Office Action, U.S. Appl. No. 13/755,622, Oct. 16, 2015, 11 pgs.
Mattes, Office Action, U.S. Appl. No. 13/750,969, Aug. 26, 2015, 16 pgs.
Mattes, Office Action, U.S. Appl. No. 13/750,969, Apr. 13, 2015, 15 pgs.
Mattes, Office Action, U.S. Appl. No. 13/755,622, Mar. 4, 2015, 8 pgs.

\* cited by examiner

INTERNET PAYMENT SYSTEM USING CREDIT CARD IMAGING

RELATED APPLICATIONS

This application is a continuation-in-part of and claims priority to U.S. patent application Ser. No. 12/502,269, entitled "Mobile Phone Payment System Using Integrated Camera Credit Card Reader" filed Jul. 14, 2009, which claims priority to U.S. Provisional Application Ser. No. 61/134,665, entitled "Mobile Phone Payment System Using Integrated Camera Credit Card Reader", filed Jul. 14, 2008, both are incorporated by reference herein in their entirety.

FIELD

The present invention generally relates to systems and methods for conducting credit card transactions over a data network such as the internet.

BACKGROUND

Points-of-sale that allow customers to purchase products and services using credit cards are usually stationary. Credit card based monetary transactions are often carried out either by systems that are configured to read data from a magnetic strip attached to the card or by manually inputting the card number and other card details. For example, the name of the cardholder and the expiry date of the card are typically printed or engraved on one surface of the card, and the Card Verification Value Code (CVV or CVC) is typically printed or engraved in the back surface of the card.

More flexible points-of-sale are provided by allowing consumer products such as cell phones, smart phones, laptops and computers to complete transactions using credit and debit cards. For example, online payments for products and/or services can be made using a credit or debit card by users who manually enter the card details to complete the transaction.

SUMMARY

Various embodiments of systems, methods and devices within the scope of the appended claims each have several aspects, no single one of which is solely responsible for the desirable attributes described herein. Without limiting the scope of the appended claims, some prominent features are described herein. After considering this discussion, and particularly after reading the section entitled "Detailed Description" one will understand how the features of various embodiments are used to enable various consumer products to be used to complete credit and debit card transactions.

One aspect of the disclosure is a method of conducting credit card transactions through a device including an image acquisition unit, a processor, a memory, and a display. In some implementations, the method comprises acquiring an image of a credit card using the image acquisition unit, extracting at least some of the credit card details from the image of the credit card, and communicating at least some of the credit card details to a third party.

Another aspect of the disclosure is a device configured to conduct credit card transactions. In some implementations, the device includes an image acquisition unit, a processor configured to at least execute instructions, a transceiver configured to transmit and receive data communications, and a memory storing instructions configured for execution by the processor, that, when executed, cause the device to: obtain an image of a credit card using the image acquisition unit, extract the credit card details from the image of the credit card, and communicate with a billing center associated with at least one credit company associated with the credit card, wherein the communication includes the extracted credit card details.

Another aspect of the disclosure is a non-transitory computer readable storage medium storing one or more instructions configured for execution by one or more processors of a device. In some implementations, when executed by the one or more processors, the stored instructions cause the device to obtain an image of a credit card using the image acquisition unit, extract the credit card details from the image of the credit card, and communicate with a billing center associated with at least one credit company associated with the credit card, wherein the communication includes the extracted credit card details.

BRIEF DESCRIPTION OF THE DRAWINGS

So that the manner in which features of the present disclosure can be understood in detail a more detailed description may be had by reference to the appended drawings. It is to be noted, however, that the appended drawings illustrate only certain typical aspects of this disclosure and are therefore not to be considered limiting of its scope, for the description may admit to other effective aspects.

Figure 1:
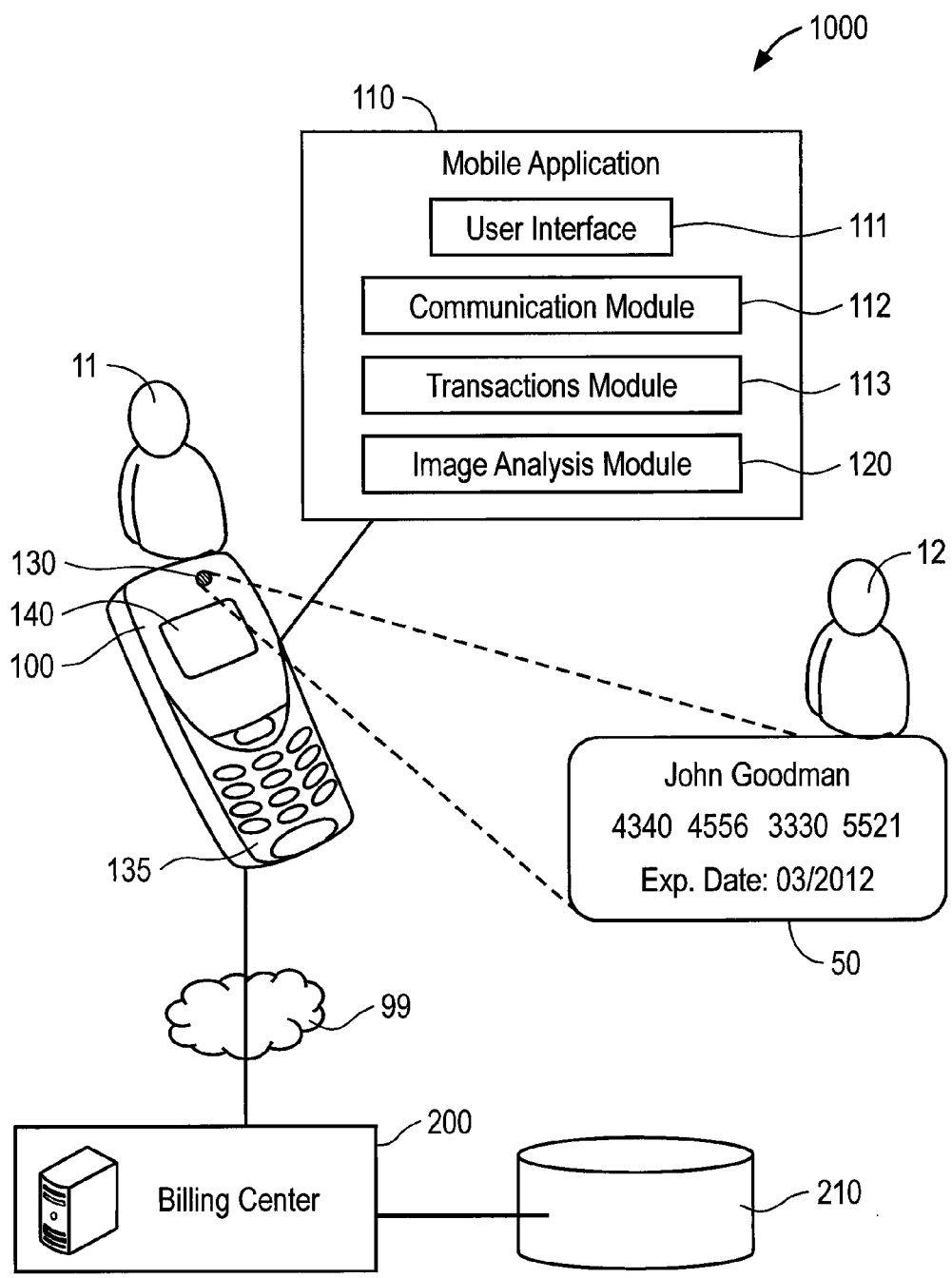
FIG. 1 is a block diagram of a system for conducting credit card transactions through a mobile device according to some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILS DESCRIPTION

Various aspects of embodiments within the scope of the appended claims are described below. It should be apparent that the aspects described herein may be embodied in a wide variety of forms and that any specific structure and/or function described herein is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structures and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a "first module" could be termed a "second module", and, similarly, a "second module" could be termed a "first module", without changing the meaning of the description, so long as all occurrences of the "first module" are renamed consistently and all occurrences of the "second module" are renamed consistently.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined that a stated condition precedent is true" or "if a stated condition precedent is true" or "when a stated condition precedent is true" may be construed to mean "upon determining" or "in response to determining" or "in accordance with a determination" or "upon detecting" or "in response to detecting" that the stated condition precedent is true, depending on the context.

The present invention, in some embodiments thereof, provides a system and a method for conducting credit card transactions through mobile devices of a user. The system and method enable a user, who may be a salesman, trader, retailer, or any other user of the mobile device to conduct and manage credit card based monetary transactions by extracting details of the credit card such as the credit card number, expiry date, and the name of owner of the card from one or more image (e.g., photographed image) of the credit card surface including those details. Managing of the monetary transaction may include enabling the user to input details of the transaction (e.g., monetary sum, payment conditions, etc.) and conducting the actual transaction via a remote billing center.

Credit cards often include one side that has a magnetic strip and the CVV details and another side having details such as the number of the card, expiry date and name of the owner (i.e. the cardholder) engraved, protruding or printed upon the surface of the card. However, some credit cards have the credit card details and a magnetic strip on the same side of the card, and yet other have the credit card details on one side of the card and a magnetic strip on the other side of the card.

The cardholder may be a client or consumer wishing to purchase a product or a service from another. Some embodiments of the present invention allow salesmen or other service providers who are mobile and do not sell at a predefined point of sale to carry out credit card and/or debit card transactions using mobile devices, such as smart-phones, tablet computers, laptop computers, and the like. Other embodiments allow cardholders to complete credit card and/or debit card transactions with online retailers or service providers using mobile devices or computers located in a home or a workplace, etc., including by using desktop computers.

The mobile device may be any device that is mobile such as a cellular phone, a personal digital assistance device (PDA), smart-phone, a tablet computer, a laptop, etc. as known in the art, that includes and/or can be provided in combination with a device for acquiring an image (e.g. a 2D photograph) of at least one side of a credit card including the credit card details. Additionally and/or alternatively, the device or system may include a desktop computer paired with a digital camera or the like.

In some embodiments, an acquired image of a credit card is analyzed to extract the details therefrom using a technique known in the art, such as, for example, Optical Characters Recognition techniques that enable the recognition of text in a 2D (two-dimensional) image. The extracted credit or debit card details may then be verified by the system and once verified a transaction process may be executed between the client and the user. In other embodiments, the transaction and verification processes are comingled so as to be indistinguishable by the user.

Reference will now be made to various embodiments, examples of which are illustrated in the accompanying drawings. In the following detailed description, numerous specific details are set forth in order to provide a thorough understanding of the invention and the described embodiments. However, the invention may be practiced without these specific details. In other instances, well-known methods, procedures, components, and circuits have not been described in detail so as not to unnecessarily obscure aspects of the embodiments.

FIG. 1 is a schematic illustration of a system 1000 for conducting credit card transactions through a mobile device 100. System 1000 may comprise a mobile device 100 of a user 11; and, a mobile application 110 operated by mobile device 100 and installed on the mobile device 100.

In some embodiments, the mobile device 100 may include: an image acquisition unit 130 (e.g. a stills and/or a video camera) configured to acquire images, such as an image of a credit card 50 (or debit card) of a client 12 placed in front the image acquisition unit 130; a mobile application 110 installed and operable on the mobile device 100; a keypad 135; and, a screen (i.e. display) 140.

In some embodiments, the mobile application 110 may comprise a user interface 111; a communication module 112; a transactions module 113; and, an image analysis module 120.

In some embodiments, the communication module 112 may enable communication with a billing center 200, which is associated with at least one credit company associated with the credit card 50 of the client 12 using the mobile device 100, for communicating over at least one communication network 99. The billing center 200 may be a computerized system holding information relating to clients accounts, billing conditions and history, transactions history, personal and other details of each of the clients and of each credit card associated with the billing center 200. The billing center 200 may be associated with one or more credit companies enabling the retrieval of data from one or more databases 210 including such information.

In some embodiments, the transactions module 113 may enable managing and conducting monetary transactions through the billing center 200. For example, the transactions module 113 enables verifying authorization for executing one or more transactions at the billing center 200. In order to execute transactions, the billing center 200 retrieves data from the database 210 to check authorization of a transaction according to predefined authorization rules followed by the billing center 200.

In some embodiments, the image analysis module 120 enables analyzing the acquired image data from the credit card 50 to output credit card details. The credit card details include, for example, the number of the credit card, expiry date, name of the credit card owner, type of card (e.g. from a logo presented on the surface of the card), or any details that are represented on the card. In some implementations, images of both surfaces of a credit card 50 are obtained in order to acquire the relevant credit card details.

With further reference to FIG. 1, in some embodiments the image analysis module 120 may be operated by the mobile application 110 operable by the mobile device 100.

In some embodiments, the billing center 200 may include a system configured to receive data from mobile devices, store/retrieve data from one or more databases, and process the retrieved data. The one or more databases, such as, database 210 may include account details of credit cards holders.

In some embodiments, the image acquisition unit 130 may also include an autofocus mechanism enabling automatic focusing and defocusing of an image of an object. In some embodiments the autofocus mechanism enables the acquisition of an image of the credit card 50, and in particular the text on the credit card, when credit card 50 is placed before the image acquisition unit 130.

In some embodiments, the user interface 111 may enable a user 11 of the mobile device 100 to view details of the credit card 50 outputted from the image analysis, confirm the outputted details, input transaction details (e.g. monetary sum of purchase, payments conditions and layout, currency, etc.) and view transaction related data, using screen 140 and keypad 135 of mobile device 100.

In some embodiments, the image analysis may include identifying segments of the credit card details according to predefined segments by identifying area segments of the credit card surface included in the acquired image. One or more of the segments may include characters relating to the credit card details (e.g. segment of each group of four to six numbers of the card number, another segment of the expiry date of the card and yet another segment of the name of the card holder). The image analysis may also include recognizing the characters in each identified segment by, for example, using an optical characters recognition (OCR) processing technique. Additionally, the analysis may also include an optional verification process that includes verifying whether all pertinent segments have been identified and the relevant characters recognized.

In some embodiments, the method includes displaying the recognized card details of at least some of the identified segments to allow a client to view at least some of the identified segments and/or the extracted details. The method may also include prompting the client to confirm that the displayed segments are correct. Additionally, the method may also include automatically repeating the process of acquiring a new image of the credit card 50 to enable re-identification of segments, in response to determining that the credit card details were not correctly recognized and displayed or could not be recognized from the acquired image (e.g. because the first image was out of focus). In other words, in some implementations, in response to determining that the credit card details were not correctly recognized, the method includes repeating the image acquisition steps without first seeking permission from the user. In some implementation, permission from the user is sought before attempting to repetition of the image acquisition steps.

In some embodiments, the image data of each acquired image may be temporarily stored within the memory of the mobile device 100. In some embodiments, for security reasons, the image and the extracted details may be deleted from the memory immediately or shortly after a transaction has been completed or terminated. Additionally and/or alternatively, the temporarily stored credit card data may be encrypted and/or compressed for storage, transmission/communication, and security purposes.

Figure 2:
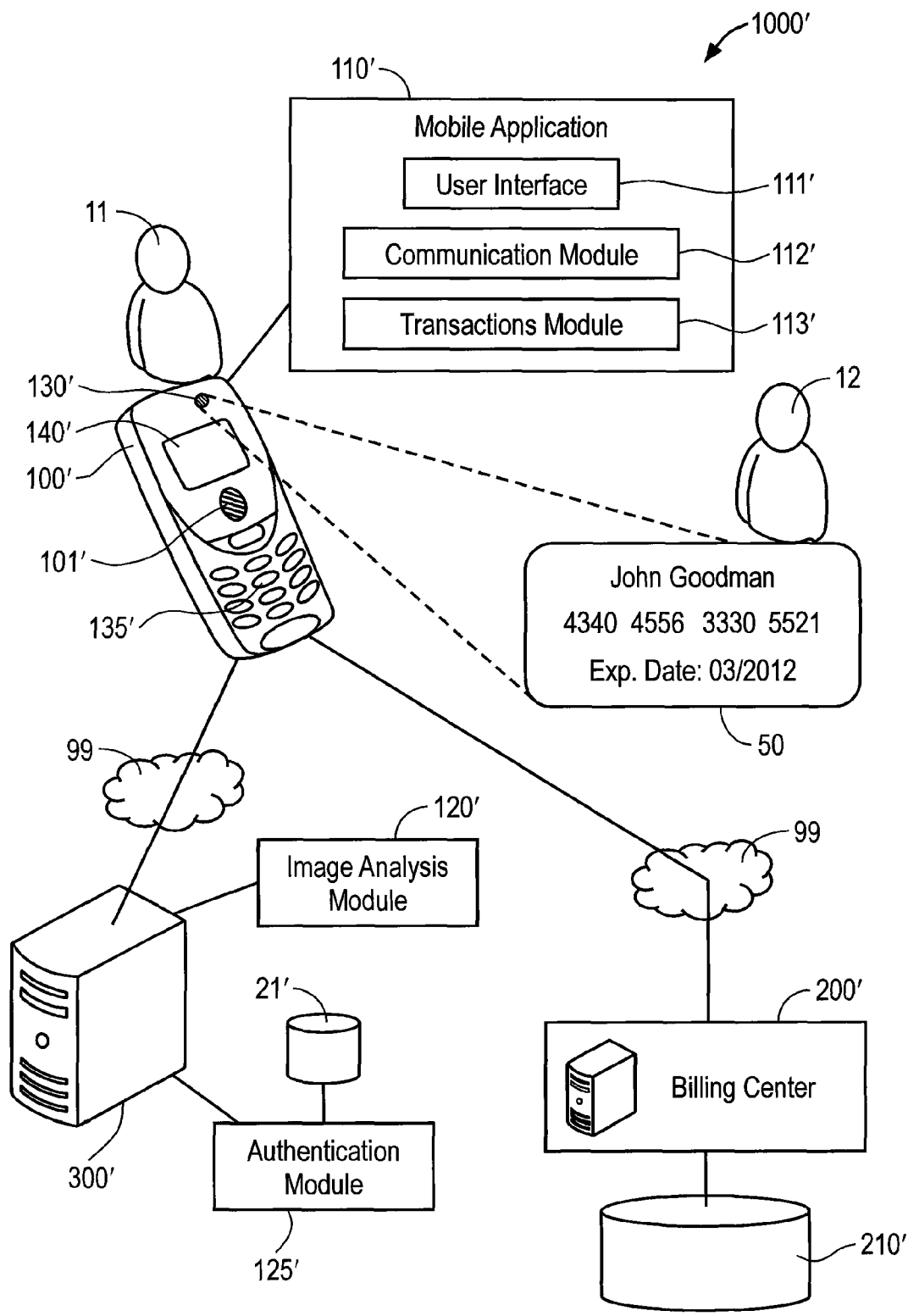
FIG. 2 is a block diagram of a system for conducting credit card transactions through a mobile device according to some implementations.

FIG. 2 is a schematic illustration of a system 1000' for conducting credit card transactions through a mobile device. The system 1000' illustrated in FIG. 2 is similar to and adapted from the system 1000 shown in FIG. 1. In some embodiments the system 1000' may comprise a mobile device 100', a mobile application 110' operable on and/or by the mobile device 100', and a server 300'. In some embodiments the server 300' includes an image analysis module 120' and an authentication module 125' installed therein.

In some embodiments, the mobile device 100' includes an image acquisition unit 130" configured to acquire images, such as, for example, an image of a credit card 50 of a client 12 placed in front of the image acquisition unit 130. The mobile device 100' may also include a mobile application 110' operable on the mobile device 100', a keypad 135', and a screen 140'.

In some embodiments, the mobile application 110' may include a user inter face 111', a communication module 112', and a transaction module 113', which may be operated and function in a similar manner to the user interface 111, communication module 112, and transaction module 113 according to embodiments described above with reference to FIG. 1.

In some embodiments, the communication module 112' is configured to communicate with a billing center 200' associated the credit card 50. In some embodiments the communication module 112' is configured to utilize elements of the mobile device 100' for communicating over at least one communication network such as a wireless communication network 99. The billing center 200' may include a system for storing and/or having access to information relating to client accounts, billing conditions and history, transactions history, and personal and other details of credit card holders. For example, the billing center 200' may be associated with one or more credit card companies and may store and/or have access to data from one or more databases 210' including relevant information.

In some embodiments, the transactions module 113' is configured to manage and conduct monetary transactions through communication with the billing center 200'. The transactions module 113' enables verifying authorization for executing each transaction at the billing center 200'. The billing center 200' retrieves data from the database 210' to conduct authorization of a transaction according to predefined authorization rules. Moreover, while certain specific features are illustrated in FIG. 2, those skilled in the art will appreciate from the present disclosure that various other features have not been illustrated for the sake of brevity and so as not to obscure more pertinent aspects of the implementations disclosed herein. For example, those skilled in the art will appreciate from the present disclosure that the system 1000' may include intervening devices and/or operations linking the transaction module 113' and billing center 200'.

With reference to FIG. 2, in some embodiments the image analysis module 120' may be a software application distinct from mobile application 110' and operable by a server 300'. In other words, in some implementations, the image analysis module 120' may be included in the server 300'. In such implementations, the mobile application 110' sends an image to the server 300' for analysis. The image analysis module 120', as described above, is configured to analyze images of credit cards received by the server 300' from a multiplicity of users 11. The mobile application 110', operating on the mobile device 100', is further configured to transmit image data of each acquired credit card image to the server 300'. The server 300' may communicate with the mobile device 100' over at least one communication network, such as the wireless communication network 99. The server 300', utilizing the image analysis module 120', may extract the credit card details from received image data in a manner similar to the embodiments described above (e.g. using OCR techniques and/or segmentation techniques).

The analysis of each acquired image, to retrieve credit card details, may be carried out by the image analysis module 120' in a similar manner according to embodiments described above (e.g. using OCR techniques and optionally segmentation techniques).

In some embodiments, the system may also include an authentication module 125', which may be operatively associated with server 300'. The authentication module 125' may be configured to authenticate a user in each session. Authentication may be carried out according to any authentication technique known in the art. For example, authentication may be carried out by enabling a user to input personal details through the mobile device 100' (e.g., pin code, user name and password etc.), where the personal details may be verified by authentication module 300'.

In some embodiments, the system 1000' may further enable automatically storing the acquired images of credit cards and other related details for each credit card session in a designated database 20' through the server 300' for further ratification and monitoring of transaction sessions.

In some embodiments, the mobile device 100' may also include one or more biometric input devices 101' configured to acquire at least one biometric characteristic of client (i.e. user) 12. The biometric characteristic can then be used by the authentication module 125' to verify the identification of client 12 by comparing the acquired biometric characteristic against information stored in a biometric database 21'.

In some embodiments, the biometric input device 101' may include a voice recording device configured to record the voice of client 12. The biometric input device 101', in combination with the authentication module 125', may be configured to analyze and identify a recorded voice pattern by comparing the recorded voice pattern with information stored in the biometric database 21'. In some embodiments, the biometric input device 101' may include a fingerprint input device configured to acquire an image of the client's 12 fingerprint. The biometric input device 101', in combination with the authentication module 125', may be configured to analyze and identify the acquired fingerprint image by comparing to fingerprint image with information stored in the biometric database 21'. While these examples specifically include voice and fingerprint recognition, those skilled in the art will appreciate from the present disclosure that various biometric input devices known in the art may also or instead be used.

Figure 3:
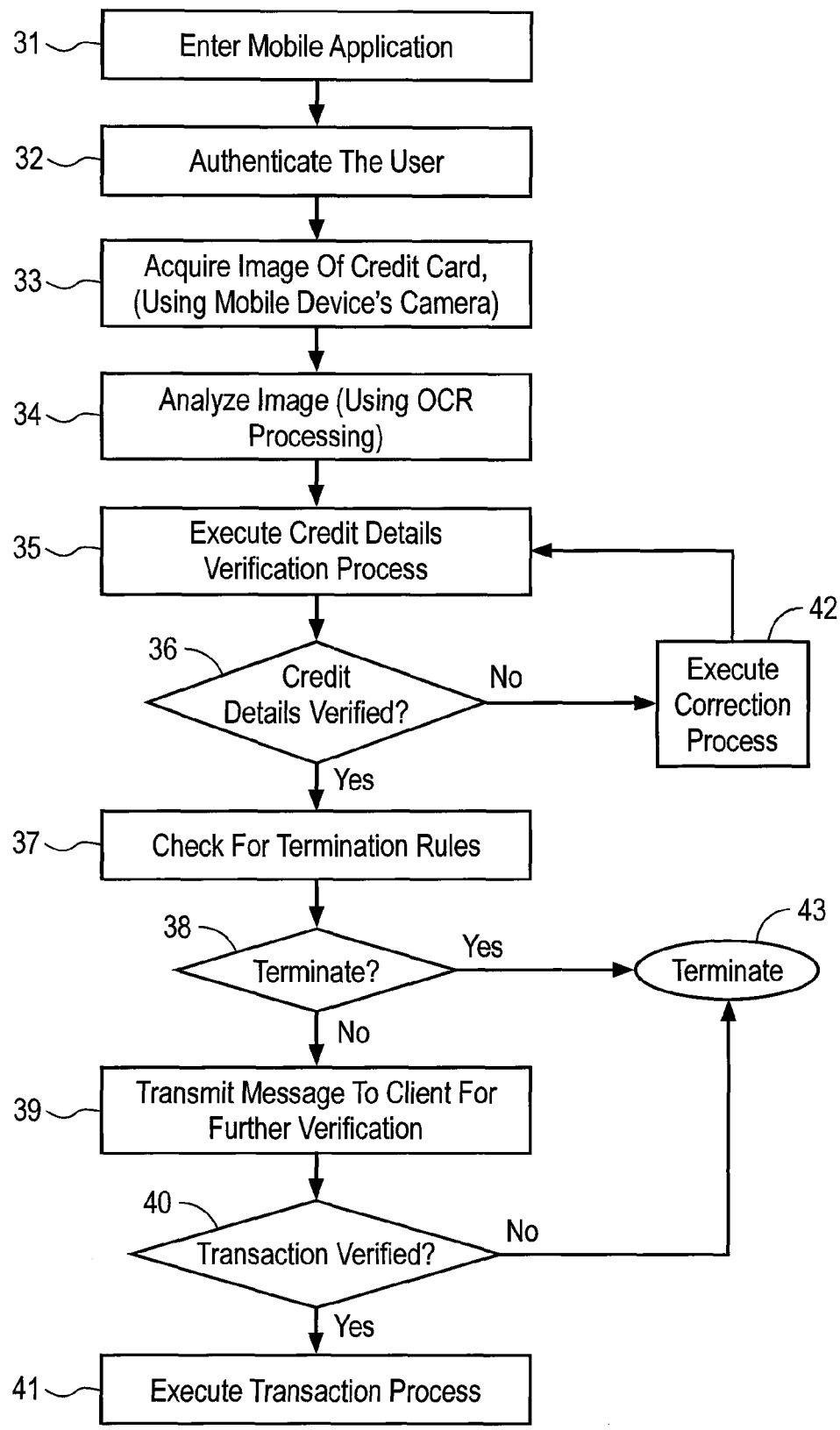
FIG. 3 is a flowchart of a method of conducting credit card transactions through a mobile device according to some implementations.

FIG. 3 is a flowchart, schematically illustrating a method of conducting credit card transactions using a mobile device according to some embodiments of the invention. As represented by block 31, the method includes initiating a mobile application. In some embodiments, the user initiates the mobile application through an interface on his/her mobile device 31 (e.g., by inputting a user identification code, which is in turn authenticated). As represented by block 32, the method includes authenticating the user 32 by, for example, searching through a predefined database including user's identification codes and authorization statuses. As represented by block 33, the method includes acquiring an image of a client's credit card (e.g. an image of the card side that contains the card details and/or the other side containing the CVV details) using the image acquisition unit of the mobile device. In some implementations, images of both surfaces of a credit card 50 are obtained in order to acquire the relevant credit card details.

As represented by block 34, the method includes analyzing the image data to identify and output the credit card details, such as, for example, the credit card holder's name, the credit card number, expiry date, and credit card type and company (e.g. by using OCR techniques). As represented by block 35, the method includes executing a verification process for verifying the outputted credit card details. In some embodiments, verification is further carried out using the user's mobile application. As represented by block 36, the method includes determining whether or not the credit card details are unverified. If the credit card details are unverified ("No" path from block 36), as represented by block 42, the method includes executing a correction process 42, in which the misidentified or missing details can be reacquired (e.g. by repeating steps 33-36). On the other hand, if the credit card details are verified ("Yes" path from block 36), as represented by block 37, the method includes checking for termination conditions according to predefined termination rules.

As such, as represented by block 38, the method includes determining whether or not the termination conditions are validated 38. If the termination conditions are validated ("Yes" path from block 38), as represented by block 43, the transaction session may be automatically terminated. On the other hand, if the termination conditions are not validated ("No" path from block 38), as represented by block 39, the method includes transmitting a message to the client/user (e.g. via email, SMS messages, etc. as known in the art) for further verification of the credit card details.

Subsequently, as represented by block 40, the method includes determining whether or not the transaction has been verified. If the transaction has not been verified ("No" path from block 40), as represented by block 43, the method includes termination of the transaction. On the other hand, if the transaction has been verified and approved by the client/user ("Yes" path from block 40), as represented by block 41, the method includes executing a transaction process, for example, to conduct a monetary transaction using the user's mobile device (e.g., by inputting the transaction details and confirming it). In some embodiments, authentication of the user may be carried out by, for example, enabling the user to input authentication details (e.g., code) and authenticating those details using a database including names and statuses of authorized users, by using biometric identification, and/or by using the mobile device's ID (e.g., phone number or IP address) to identify the user.

Figure 4:
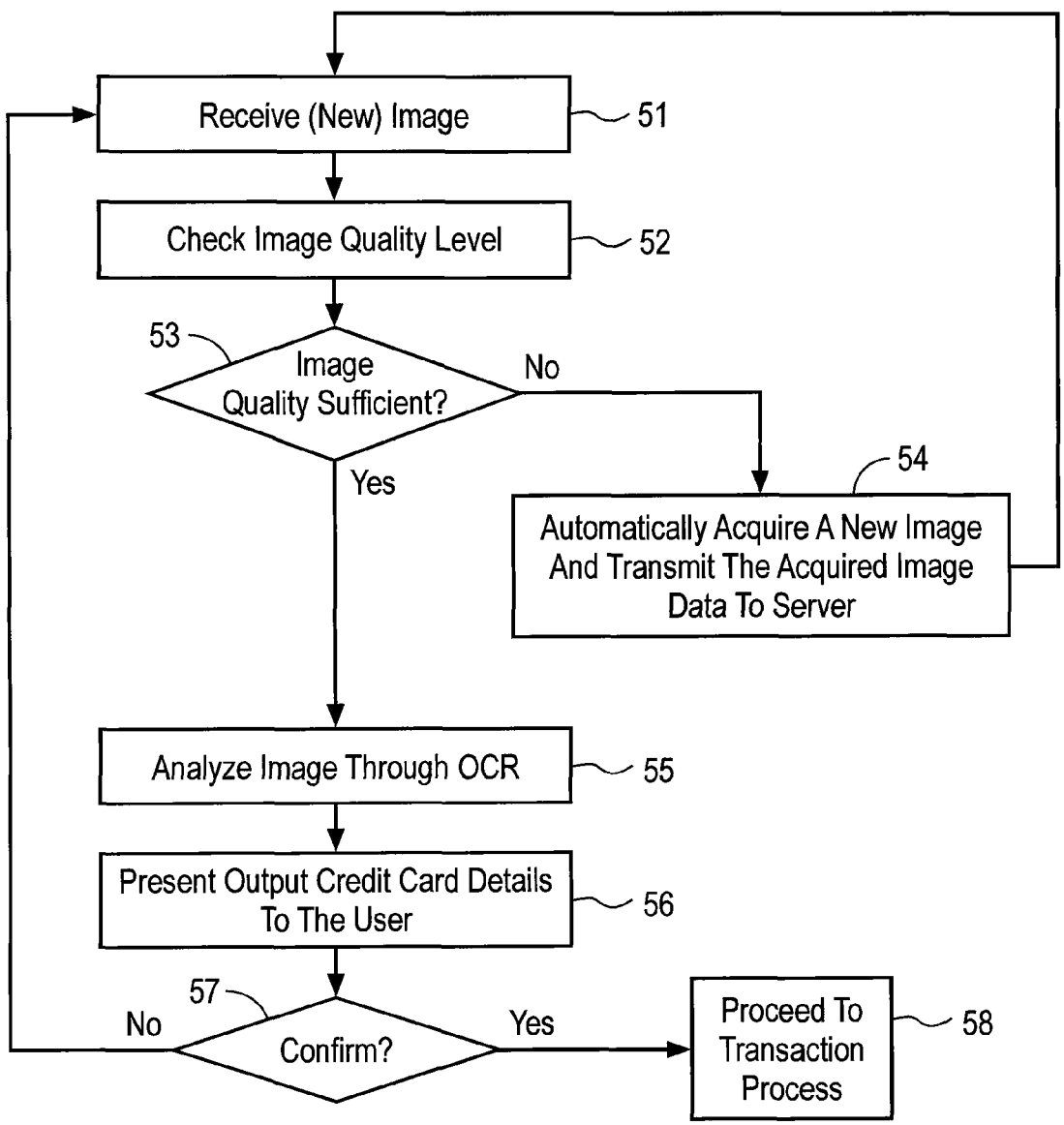
FIG. 4 is a flowchart of a process of verifying credit card details for conducting transactions through a mobile device according to some implementations.

FIG. 4 is a flowchart, schematically illustrating the process of verifying credit card details of the client for conducting transactions through the user's mobile device according to some embodiments of the invention. As represented by block

51, the method includes receiving a newly acquired image of the credit card side comprising the credit card details from the image acquisition unit.

As represented by block 52, the method includes checking the quality level of the received image. As represented by block 53, the method includes determining the sufficiency of the image quality. If the quality level is insufficient according to predefined rules and conditions ("No" path from block 53), as represented by block 54, the method includes automatically acquiring a new image using the image acquisition unit and transmitting the image data to the image analysis module and repeating steps 51-53. On the other hand, if the image quality is sufficient ("Yes" path from block 53), as represented by block 55, the method includes analyzing the received image (e.g. using OCR analysis technique) to identify the details of the credit card.

Subsequently, as represented by block 56, the method includes presenting the identified credit card details to the client and/or user (e.g. through the screen of the user's mobile device and/or by transmitting a message to the client). As represented by block 57, the method includes enabling the client and/or user to confirm the presented details. If the client and/or user does not confirm the presented credit card details ("No" path from block 57), the method includes looping back to the portion of the method represented by block 51. On the other hand, when the client and/or user inputs a confirmation of the presented credit card details ("Yes" path from block 57), as represented by block 58, the method includes proceeding to the transaction process.

Figure 5:
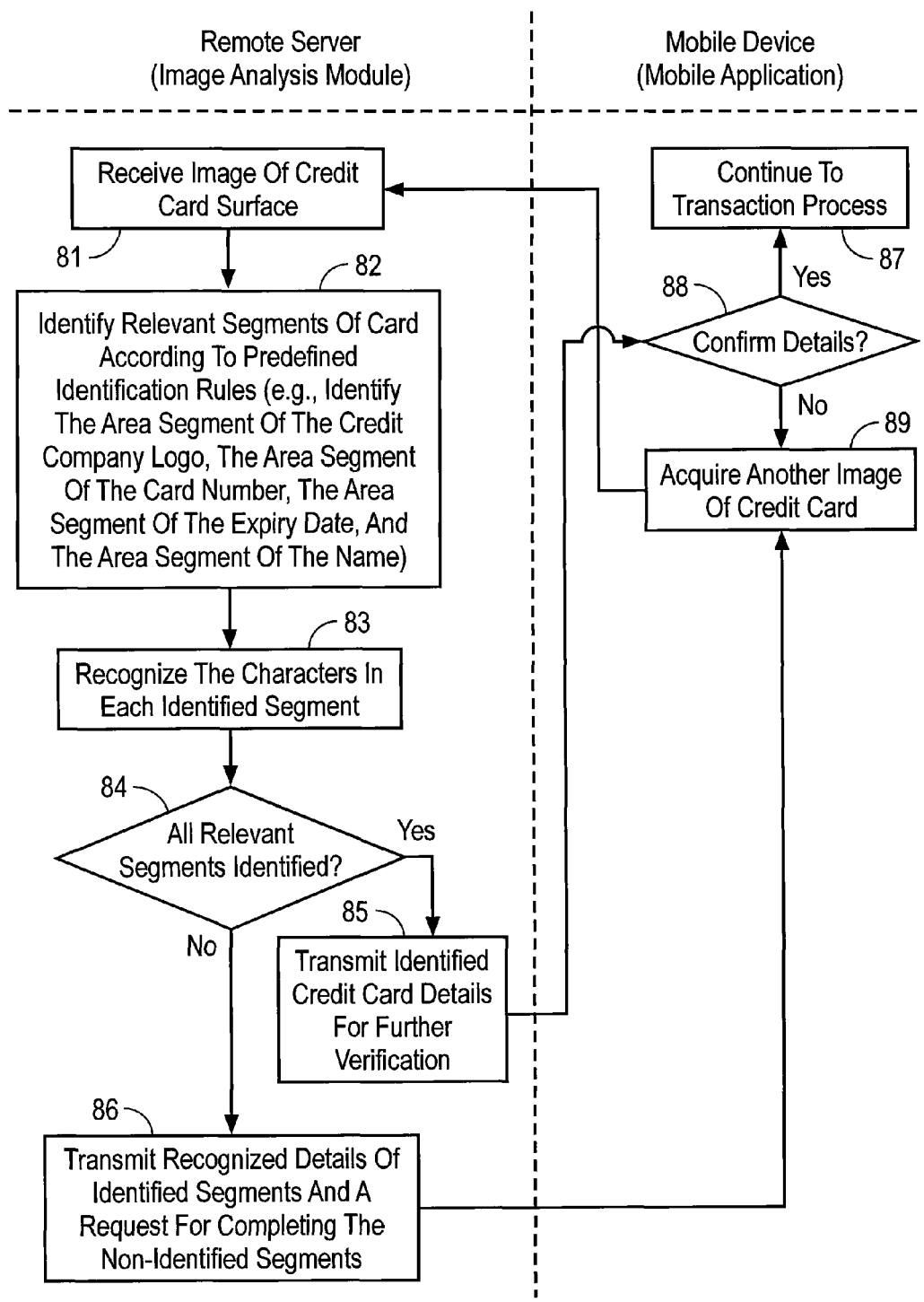
FIG. 5 is a flowchart of a process of analyzing an image of a credit card using a server for carrying out the analysis according to some implementations.

FIG. 5 is a flowchart schematically illustrating a method of analyzing an acquired image of a credit card using a server for carrying out the analysis according to some embodiments of the invention. As represented by block 81, the method includes receiving an acquired image of the credit card surface (preferably a side containing the relevant credit card details). As represented by block 82, the method includes identifying relevant segments of the credit card surface according to predefined identification rules. More specifically, for example, the method includes identifying the segments containing number-groupings where the groups combined in order from left to right make out the credit card number, the segment containing the expiry date of the card, the segment containing the company's logo including the card type, and the segment containing the name of the card holder.

As represented by block 83, the method includes recognizing the characters in each identified segment, using OCR for example. As represented by block 84, the method includes determining if all the relevant segments and the details they contain were identified. If the card details have been identified ("Yes" path from block 84), the method includes transmitting the identified details from the server to the application of the mobile device. Subsequently, as represented by block 88, and discussed in greater detail below, the method includes presenting the details to the client and/or user for confirmation. With further reference to block 84, if the card details could not and/or were not identified ("No" path from block 84), as represented by block 86, the method includes transmitting a message to the mobile device from the server indicating and/or presenting the identified details for confirmation and informing the user/client about the unidentified segments.

With further reference to block 88, if the details are confirmed ("Yes" path from block 88), as represented by block 87, the method includes continuing the transaction process. On the other hand, if some of the segments are unidentified or the identified details are not confirmed ("No" path from block 88), as represented by block 89, the method includes acquiring a new image of the same credit card to repeat the steps described above until all segments are identified and all details recognized or the data is entered manually by the user or client.

Additionally and/or alternatively, in some embodiments, if the process of checking the image quality fails to verify and/or provide a satisfactory image quality (see step 53 discussed above with reference to FIG. 4) after several attempts (e.g. after some threshold number of attempts), the system may delay futures attempts for some period of time and/or terminate the session and output a message to the user through one or more messaging services (such as through the user interface of the mobile application). In some embodiments, terminating the session also includes forcing the user or client to restart the process by acquiring a new image of the credit card.

Figure 6:
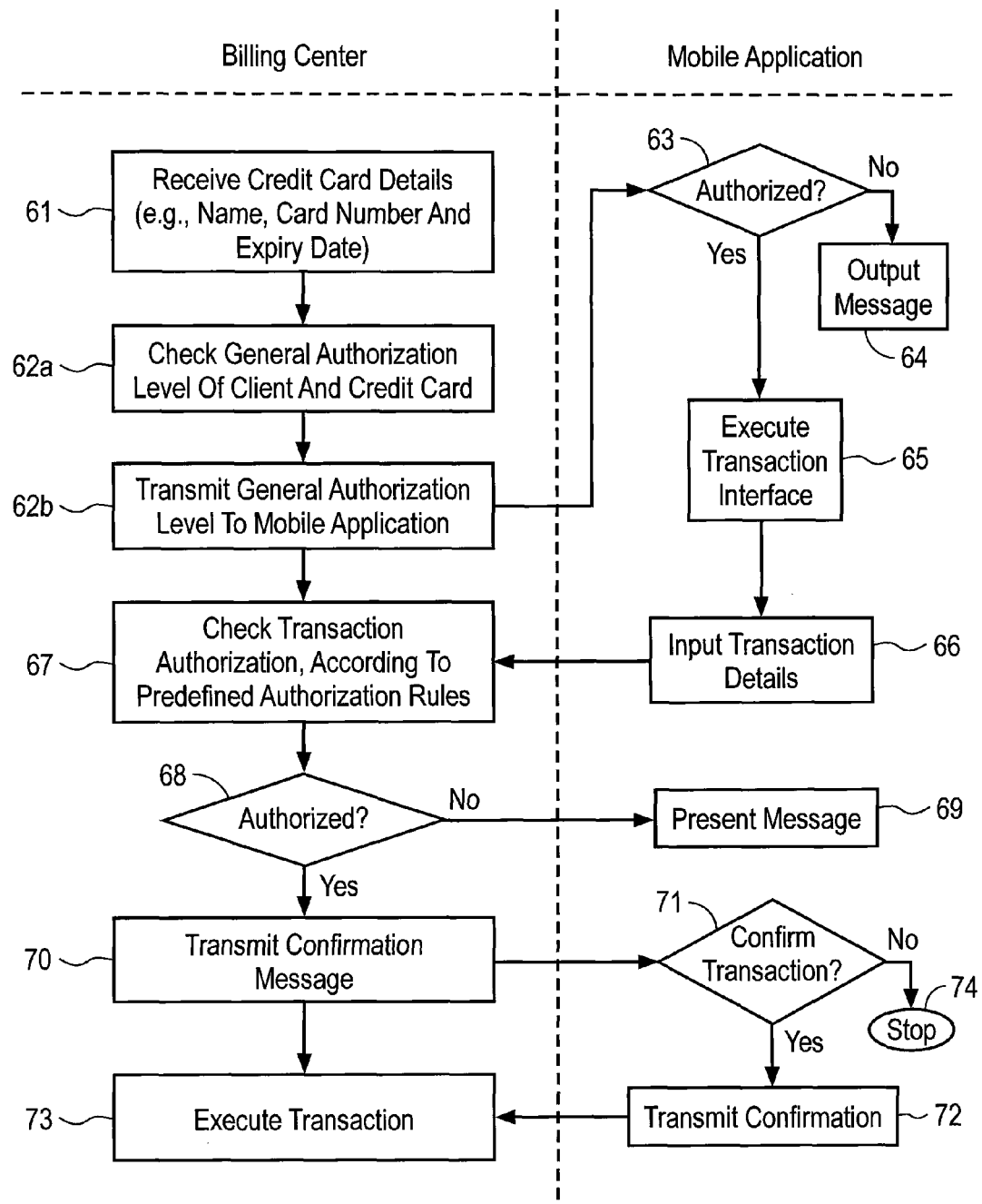
FIG. 6 is a flowchart of a process of conducting a credit card transaction according to some implementations.

FIG. 6 is a flowchart, schematically illustrating a method of conducting a credit card monetary transaction according to some embodiments of the invention. As represented by block 61, the method includes receiving details of the credit card (e.g. name of the holder, number, expiry date, company and type of credit card, and/or CVV). In some embodiments the billing center receives the details from the mobile application using the mobile device to transmit the details to the billing center. As represented by block 62a, the method includes checking a general authorization level of the client and/or the user. In some embodiments, the authorization is not related to the type and details of the transaction but to the general authorization of the client and/or the user to conduct credit card transactions. Subsequently, as represented by block 62b, the method includes transmitting the resulting general authorization to the mobile application from the billing center.

As represented by block 63, the method includes determining if the client and/or the user is authorized. If the client is unauthorized ("No" path from block 63), as represented by block 64, the method includes outputting a suitable message informing the user that no transaction can be approved with the credit card that was presented. On the other hand, if the client and/or the user is authorized ("Yes" path from block 63), as represented by block 65, the method includes executing a transaction interface by the mobile application.

As represented by block 66, the method includes receiving transaction details input by the user, where the transaction interface allows the user to input the transaction details (e.g. monetary sum, payments conditions, date of transaction, specification of the supplied service/goods etc.). In some implementations, the transaction details are entered by an application (e.g. a website application, a local application, etc.) for the client and/or user in response to the client and/or user electing to proceed with a transaction. In various embodiments, depending on the system's definitions, the inputting of the transaction details may be carried out before, during, or after the verification process or even prior to the acquiring of the credit card image, depending on the system's definitions. Subsequently, as represented by block 67, the method includes the billing center checking the transaction authorization by verifying authorization of the inputted monetary transaction.

As represented by block 68, the method includes determining if the transaction is authorized. If the transaction is authorized 68 ("Yes" path from block 68), as represented by block 70, the method includes the billing center transmitting a confirmation message to the mobile application for final confirmation, which is performed by the portion of the method represented by block 71 discussed in greater detail below. In some embodiments, the confirmation message may comprise, for example, the details of the transaction. In some implementations, the confirmation message may comprise an indication that the transaction has been completed. On the other hand, if the transaction is not authorized ("No" path from block 68), as represented by block 69, the method includes presenting a predefined message to the user/client.

With reference to block 71, if the user/client confirms the transaction ("Yes" path from block 71), as represented by block 72, the method includes the mobile application transmitting the confirmation to the billing center. Subsequently, as represented by block 73, the method includes executing the transaction at the billing center, which uses the verified credit card details and the transaction details. On the other hand, if the user/client rejects the transaction ("No" path from block 71), as represented by block 74, the method includes terminating the transaction.

Figure 7:
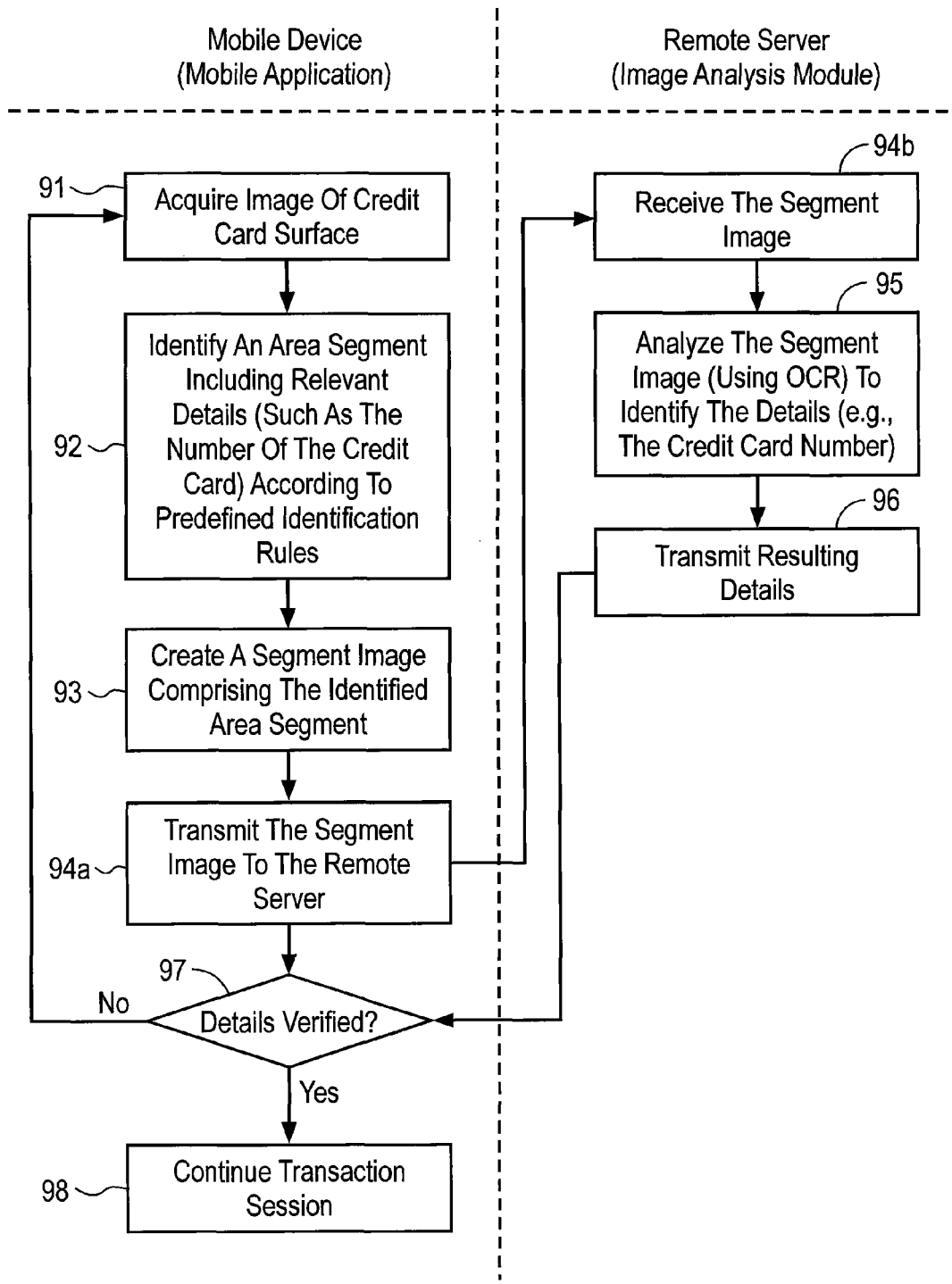
FIG. 7 is a flowchart of a process for acquiring an image of a segment of the credit card according to some implementations.

FIG. 7 is a flowchart schematically illustrating a method of acquiring and analyzing an image of a segment of a credit card comprising relevant credit card details according to some embodiments of the invention. As represented by block 91, the method includes acquiring an image of a credit card surface using the image acquisition unit at the mobile device (e.g. the user's mobile phone camera, or digital camera connectable to a computer). As represented by block 92, the method includes identifying at least one segment area in the acquired image of the credit card surface that includes relevant details of the credit card (e.g. the area that includes the number of the credit card). In some embodiments, the mobile application enables the identification of the segment area according to predefined identification rules.

As represented by block 93, the method includes the mobile application creating an image of the segment area including the segment area. As represented by block 94*a*, the method includes transmitting the created segment image of the segment area to the image analysis module from the mobile device. In some embodiments, the image analysis module is operated by and installed on the server. As represented by block 94*b*, the method includes receiving the transmitted segment image at the image analysis module. As represented by block 95, the method includes analyzing the received image of the segment area to identify and recognize the details of the credit card (e.g. credit card number). As represented by block 96, the method includes transmitting the resulting details to the mobile device for further verification.

Accordingly, as represented by block 97, the method includes determining if the details are verified. If the details are verified 97 by the client ("Yes" path from block 97), as represented by block 98, the method includes continuing the transaction session for conducting the monetary transaction. On the other hand if the details are not verified ("No" path from block 97), the method may begin again, directing the system to repeat steps 91-98 or terminate the session altogether.

Figure 8:
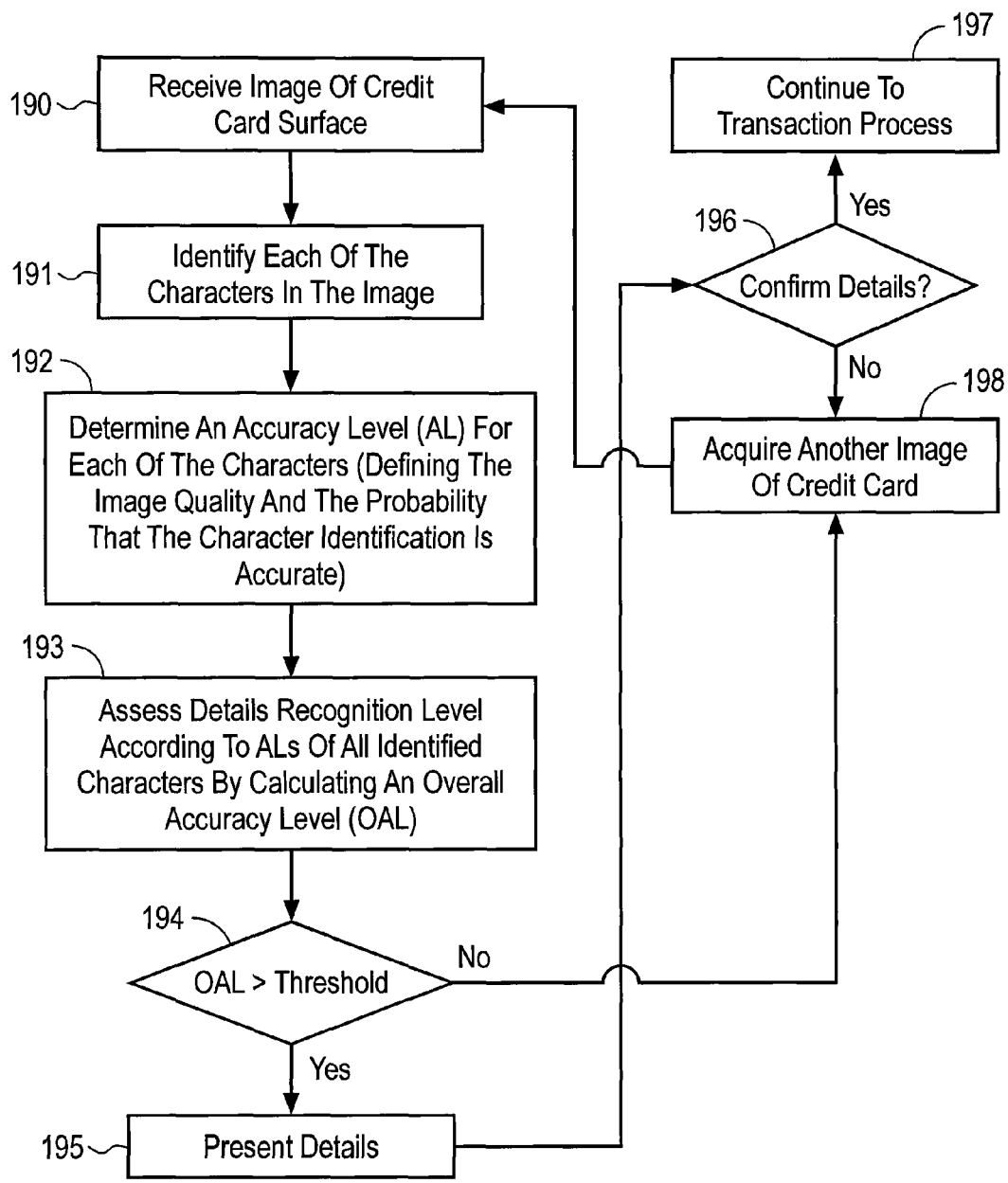
FIG. 8 is a flowchart of a verification process for verifying credit card details according to some implementations.

FIG. 8 is a flowchart schematically illustrating a process for verifying the details of a credit card according to some embodiments of the invention. As represented by block 190, the method includes receiving an image of the credit card surface that preferably includes the relevant details. As represented by block 191, the method includes identifying each of the characters in the image using OCR or the like. As represented by block 192, the method includes determining an accuracy level (AL) for each of the characters according to predefined rules (e.g. using image analysis and shape recognition). In some embodiments, the rules are configured to define the quality of the character's image and the probability that the character identification is accurate. As represented by block 193, the method includes assessing the recognition level of the details according to the determined accuracy levels of all identified characters. In some embodiments, the recognition level is determined according to predefined rules, such as, for example, by calculating an overall accuracy level (OAL) that factors in the accuracy levels of at least some of the identified characters.

As represented by block 194, the method includes determining whether the calculated OAL breaches a predefined threshold. If the OAL breaches the threshold ("Yes" path from block 194), as represented by block 195, the method includes, presenting the credit card details to the user and/or client. Subsequently, as represented by block 196, which is discussed in greater detail below, the method includes seeking confirmation of the details from the user and/or client. With further reference to block 194, if, on the other hand, the OAL does not breach the threshold ("No" path from block 194), as represented by block 198, the method includes acquiring another image of the credit card by prompting the user and/or client.

If the details are confirmed ("Yes" path from block 196), as represented by block 197, the method includes continuing the transaction process (i.e. continuing to manage the transaction process). On the other hand, if the details are not confirmed ("No" path from block 196), as represented by block 198, the method includes acquiring another image of the credit card by prompting the user and/or client.

Figure 9:
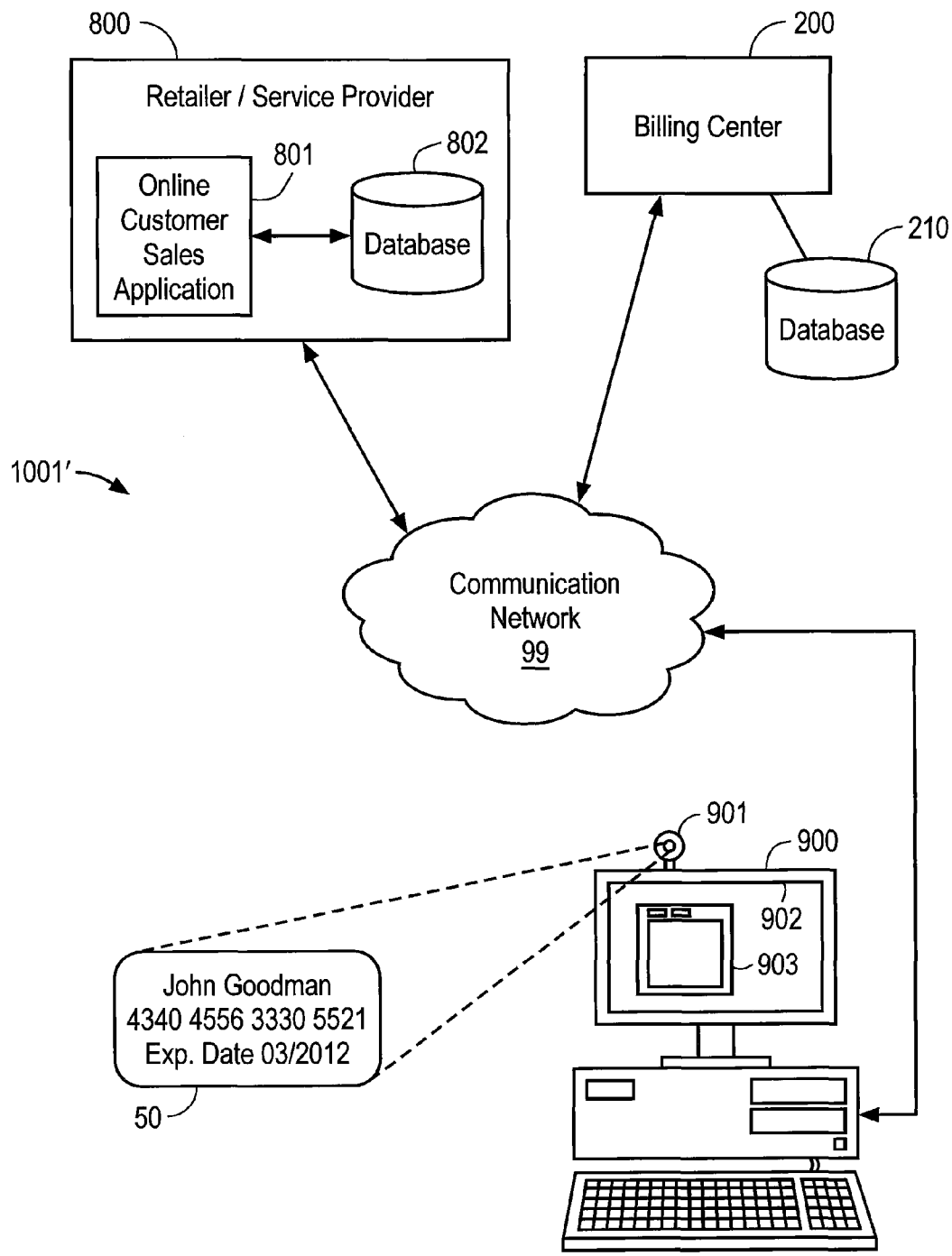
FIG. 9 is a block diagram of a system for conducting credit card transactions through a user device/system, according to other embodiments of the invention.

FIG. 9 is a schematic illustration of a system 1001' for conducting credit card transactions using a computer, such as a laptop, desktop, or tablet. The system 1001' illustrated in FIG. 9 is similar to and adapted from the system 1000 shown in FIG. 1. While certain specific features are illustrated, those skilled in the art will appreciate from the present disclosure that various other features have not been illustrated for the sake of brevity and so as not to obscure more pertinent aspects of the implementations disclosed herein. To that end, the system 1001' may comprise a computer 900, a billing center 200, a retailer/merchant (or service provider) 800, and a communications network 99.

The computer includes a display 902 and a digital camera 901. The mobile application is operated at least in part by the computer 900, and is represented by user interface 903 (e.g. a display window or the like) presented on the display 902 of the computer 900. The retailer 800, for example, includes an online customer sales application 801 and a database 802. In some implementations, the retailer 800 includes a local customer sales application, such as a point-of-sale terminal within a department store. The retailer 800 may be an online service provider (e.g. a gambling website, a social networking website, a dating website, etc.) or a retailer of real and/or digital goods (e.g. clothing, music, etc.). In some embodiments, the computer 900 is enabled to communicate with a billing center 200 and the retailer 800. For example, the computer may include at least one of an Ethernet enabled network adapter or interface, a WiFi enabled network adapter or interface, cable modem, DSL modem, a cellular wireless device, or the like.

In operation, a user may use the computer 900 to access the online customer sales application 801 provided by the retailer 800. In order to make a purchase through the online customer sales application 801, the camera 901 is used to obtain at least one image of the credit card 50, which is processed according to one of the various methods described above, with pertinent information provided by both the retailer 800 and the user of computer 900.

As noted above with reference to FIG. 1, in some embodiments the billing center 200 is associated with at least one credit company associated with the credit card 50. As noted above with reference to FIG. 1, the billing center 200 may be a computerized system holding information relating to client accounts, billing conditions and history, transactions history, and personal and other details of each of clients and of each credit card associated with the billing center 200. The billing center 200 may be associated with one or more credit companies, enabling the retrieval of data from one or more databases 210 including such information.

In some embodiments, the computer 900 is configured with a software module to manage and conduct monetary transactions with the billing center 200. For example, the computer 900 enables verifying authorization for executing one or more transactions at the billing center 200. In order to execute transactions, the billing center 200 retrieves data from the database 210 to check authorization of a transaction according to predefined authorization rules followed by the billing center 200.

In some embodiments, the digital camera 901 is operable by the computer 900 to acquire an image of the credit card 50. The credit card details include, for example, the number of the credit card, expiry date, name of the credit card owner, type of card (e.g. from a logo presented on the surface of the card), or any other details or other information that are presented on the card.

In some embodiments, the user interface 903 is configured to enable a user of the computer 900 to view details of the credit card 50 outputted from the image analysis, confirm the outputted details, input transaction details (e.g. monetary sum of purchase, payments conditions and layout, currency, etc.), and view transaction related data using the display 902 and peripheral devices (e.g. keyboard, mouse, etc.) associated with the computer 900.

Although various features of the invention may be described in the context of a single embodiment, the features may also be provided separately or in any suitable combination. Conversely, although the invention may be described herein in the context of separate embodiments for clarity, the invention may also be implemented in a single embodiment.

In the above description, an embodiment is an example or implementation of the inventions. The various appearances of "one embodiment," "an embodiment," or "some embodiments" do not necessarily all refer to the same embodiments. Reference in the specification to "some embodiments," "an embodiment," "one embodiment," or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may," "might," "can," or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

What is claimed is:

1. A method of conducting a credit card transaction, the method comprising:
   at a device including an image acquisition unit, a processor, a memory, and a display:
      capturing an image of a credit card using the image acquisition unit of the device, wherein the image acquisition unit automatically focuses on credit cards details of the credit card including at least one of a credit card number, a name of the credit card holder, and an expiration date of the credit card;
      prompting, at the device, a user of the device to provide biometric information to verify the user's identity, wherein the biometric verification information is at least one of voice or fingerprint data;

obtaining, at the device, the biometric information from the user of the device;

transmitting, from the device, (A) at least a portion of the captured image of the credit card and (B) the obtained biometric information to a server;

in accordance with a determination that the biometric information is verified by the server, receiving, at the device, from the server: (i) credit card information extracted by the server from the portion of the image of the credit card, wherein the credit card information at least includes the credit card number, the name of the credit card holder, and the expiration date of the credit card;

prior to causing execution of the credit card transaction, prompting the user of the device to confirm the credit card transaction based on the credit information extracted from the portion of the image of the credit card by the server; and executing the credit card transaction upon confirmation received from the device.

2. The method of claim 1, wherein the server is associated with a billing center corresponding to the credit card.

3. The method of claim 1, further comprising:
in response to receiving, from the server, the credit card information extracted from the portion of the image of the credit card, presenting the extracted credit card information on the display of the device.

4. The method of claim 1, further comprising:
prior to capturing the image of the credit card, receiving an input indicative of initiating the credit card transaction.

5. The method of claim 4, wherein the input is received through one of a user interface provided with the device and communication unit provided with the device.

6. The method of claim 1, further comprising:
storing the captured image of the credit card.

7. The method of claim 1, further comprising:
prior to transmitting at least the portion of the image of the credit card to the server, encrypting at least the portion of the captured image.

8. The method of claim 1, further comprising:
in response to receiving, from the server, the credit card information extracted from the portion of the image of the credit card, encrypting at least some of the credit card details.

9. The method of claim 1, further comprising:
identifying at least one segment area in the captured image that includes at least one credit card detail, wherein the credit card detail is one of the credit card number, the name of the credit card holder, and the expiration date of the credit card; and
creating a segment image including the identified segment area.

10. The method of claim 1, further comprising:
prior to transmitting at least the portion of the image of the credit card to the server:
identifying one or more characters in the captured image;
determining an accuracy level for each of the one or more characters;
determining an overall recognition level for the captured image according to the accuracy levels determined for each of the one or more characters; and
in accordance with a determination that the overall recognition level for the captured image is below a predetermined threshold, capturing a second image of the credit card using the image acquisition unit of the device.

11. The method of claim 1, further comprising:
prior to transmitting at least the portion of the image of the credit card to the server:
determining a quality metric for the captured image; and
in accordance with a determination that the quality metric for the captured image is insufficient, capturing a second image of the credit card using the image acquisition unit.

12. The method of claim 1, further comprising:
in accordance with a determination that the biometric information is verified by the server and prior to receiving the credit card information and the prompting of the user of the device to confirm the credit card transaction:
receiving information, from the server, indicating that the credit information was not successfully extracted from the portion of the image of the credit card; and
performing at least one of capturing a second image of the credit card using the image acquisition unit and providing feedback to the user of the device.

13. The method of claim 1, further comprising:
concurrently presenting the credit card information extracted by the server from the portion of the image of the credit card and the prompting of the user of the device to confirm the credit card transaction.

14. The method of claim 1, further comprising:
in accordance with a determination that the biometric information is verified by the server, receiving, at the device, from the server:
(iii) transaction information determined by the server that corresponds to the credit card transaction, wherein the transaction information at least includes a transaction amount and a specification of goods or services corresponding to the credit card transaction.

15. The method of claim 6, further comprising:
in response to transmitting at least the portion of the image of the credit card to the server, deleting the captured image of at least the portion of the credit card.

16. The method of claim 8, wherein the encrypted credit card details are stored in the memory.

17. The method of claim 9, wherein identifying the at least one segment area includes:
recognizing at least some of the characters identified in the at least one identified segment area corresponding to the at least one credit card detail.

18. The method of claim 11, wherein capturing the second image includes prompting the user of the device to present the credit card again.

19. A non-transitory computer readable storage medium storing one or more instructions configured for execution by one or more processors of a device with an image acquisition unit, that, when executed by the one or more processors, cause the device to:
receive an input from a user of the device to initiate a credit card transaction;
in response to receiving the input from the user of the device to initiate the credit card transaction:
capture an image of a credit card using the image acquisition unit of the device, wherein the image acquisition unit automatically focuses on credit cards details of the credit card including at least one of a credit card number, a name of the credit card holder, and an expiration date of the credit card;

prompt a user of the device to provide biometric information to verify the user's identity, wherein the biometric verification information is at least one of voice or fingerprint data;
obtain the biometric information from the user of the device;
transmit, from the device, (A) at least a portion of the image of the credit card and (B) the obtained biometric information to a server;
in accordance with a determination that the biometric information is verified by the server, receive, at the device, from the server credit card information extracted by the server from the portion of the image of the credit card, wherein the credit card information at least includes the credit card number, the name of the credit card holder, and the expiration date of the credit card;
prior to causing execution of the credit card transaction, prompt the user of the device to confirm the credit card transaction by the server based on the credit information extracted from the portion of the image of the credit card by the server; and
execute the credit card transaction upon confirmation received from the device.

20. A device, comprising:
an image acquisition unit configured to captured images;
a processor configured to at least execute instructions;
a transceiver configured to transmit and receive data communications; and
a memory storing instructions configured for execution by the processor, that, when executed cause the device to:
receive an input from a user of the device to initiate a credit card transaction;
in response to receiving the input from the user of the device to initiate the credit card transaction:
capture an image of a credit card using the image acquisition unit, wherein the image acquisition unit automatically focuses on credit cards details of the credit card including at least one of a credit card number, a name of the credit card holder, and an expiration date of the credit card;
prompt a user of the device to provide biometric information to verify the user's identity, wherein the biometric verification information is at least one of voice or fingerprint data;
obtain the biometric information from the user of the device;
transmit (A) at least a portion of the image of the credit card and (B) the obtained biometric information to a server using the transceiver;
in accordance with a determination that the biometric information is verified by the server, receive, from the server, using the transceiver: (i) credit card information extracted by the server from the portion of the image of the credit card, wherein the credit card information at least includes the credit card number, the name of the credit card holder, and the expiration date of the credit card;
prior to causing execution of the credit card transaction, prompt the user of the device to confirm the credit card transaction based on the credit information extracted from the portion of the image of the credit card by the server; and
execute the credit card transaction upon confirmation received from the device.

* * * * *